W. D. SMITH.
OCCUPANT PROPELLED VEHICLE.
APPLICATION FILED SEPT. 6, 1919.
1,350,577.     Patented Aug. 24, 1920.
2 SHEETS—SHEET 2.
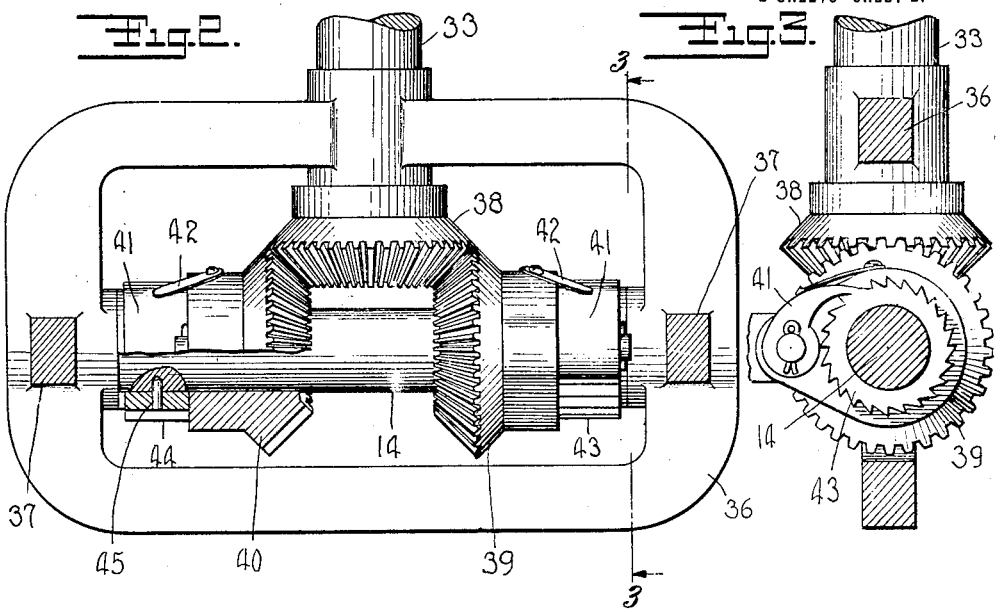
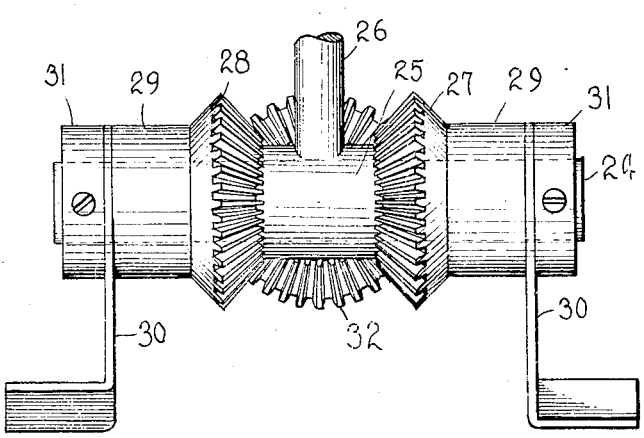
Winfield D. Smith, Inventor,
By his Attorney
W. P. Hutchinson.

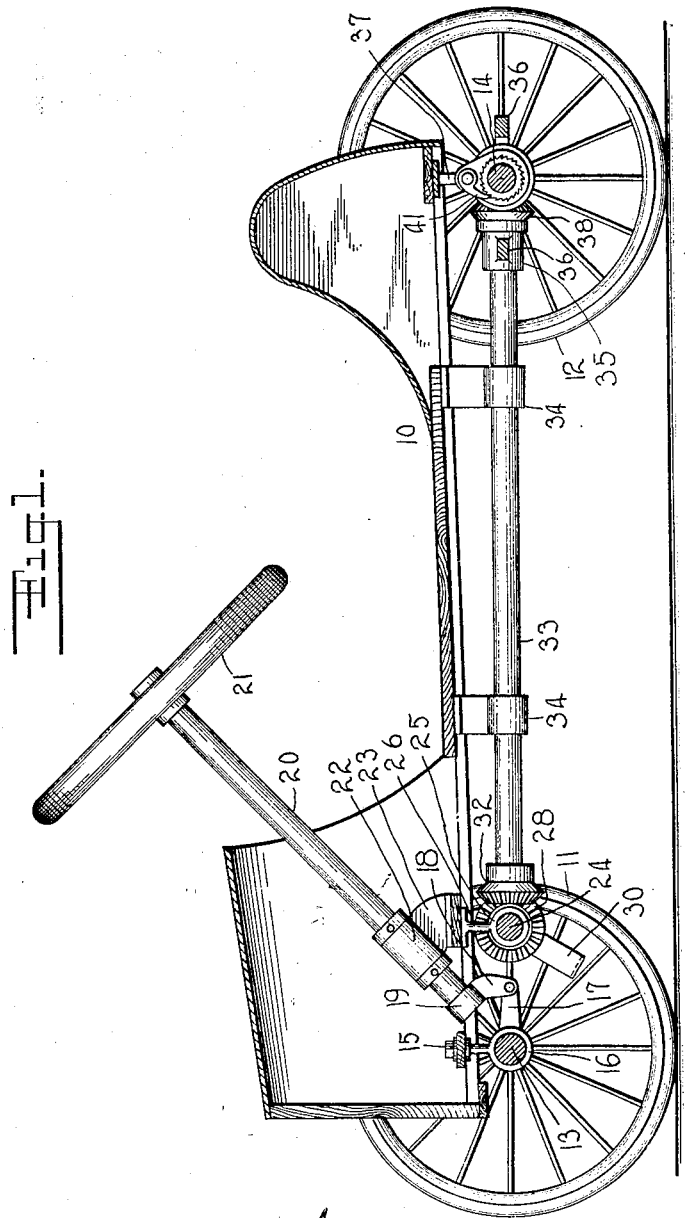

UNITED STATES PATENT OFFICE.

WINFIELD D. SMITH, OF NEWARK, NEW JERSEY, ASSIGNOR OF ONE-HALF TO HENRY F. HAYES, JR., OF NEWARK, NEW JERSEY.

OCCUPANT-PROPELLED VEHICLE.

1,350,577.   Specification of Letters Patent.   Patented Aug. 24, 1920.

Application filed September 6, 1919. Serial No. 322,215.

*To all whom it may concern:*

Be it known that I, WINFIELD D. SMITH, a citizen of the United States, and a resident of the city of Newark, county of Essex, and State of New Jersey, have invented a new and useful Improvement in Occupant-Propelled Vehicles, of which the following is a full, clear, and exact description.

My invention relates to improvements in vehicles which are propelled by the occupant and the object of my invention is to produce a vehicle which has a simple and efficient mechanism for driving, steering, and controlling it. More particularly this invention is an improvement on the structure shown in Letters Patent of the United States No. 1,326,697, dated December 30, 1919. As shown in the prior patent above referred to, the vehicle is propelled by hand from the oscillations of a wheel analogous to the steering wheel, from which power is transmitted to the forward axle. While this is all right for many purposes, still for some purposes it is not so desirable, chiefly for the reason that people are accustomed to using the steering wheel for steering purposes only, and it requires a little practice to use the wheel naturally and efficiently as a means of transmitting power. In my present invention I use the steering wheel for its ordinary function, and transmit power from the front of the vehicle to the axle by a gear mechanism quite similar in some respects to that shown in my prior application referred to. The power is transmitted to a counter-shaft by pedals, and from here a gear mechanism carries the energy to the rear axle, and the oscillations of the pedals as they move backward and forward are transformed into continuous rotary motion at the rear axle. My invention is intended to provide a simple means of carrying out the above functions. Other advantages of it will appear from the description which follows.

Reference is to be had to the accompanying drawings forming a part of this specification, in which similar reference characters indicate corresponding parts in all the views.

Figure 1 is a longitudinal sectional elevation of a vehicle showing my improvements.

Fig. 2 is an enlarged detail plan partly in section of the gear mechanism which drives the rear axle.

Fig. 3 is a section on the line 3—3 of Fig. 2, and

Fig. 4 is a development of the pedal mechanism at the forward axle.

The vehicle is provided with a body 10 which obviously can be made of any approved design, and the structure of which forms no part of this invention. It is provided with front and rear wheels 11 and 12 which are provided with axles 13 and 14, the wheels and axles being arranged as usual to turn together. The front axle pivotally supports the front end of the body 10, and this pivotal connection can be of any customary or preferred type. I have shown a simple king bolt 15 connected with a ring or journal 16 on the axle 13, and this ring or journal is provided with an arm 17 which extends rearwardly and has a loose connection with a second arm 18 fixed to the collar 19 on the steering rod 20 which is journaled as shown at 22 in a bracket 23 carried on the floor of the body 10. The steering rod has a suitable steering wheel or equivalent device 21 at the top. Obviously the particular means of connecting the steering rod and front axle can be departed from at will, the essential thing being to have the steering rod arranged so as to swivel the front wheels and axle with relation to the body.

At the front end of the vehicle is a counter-shaft 24 which is suitably supported and can conveniently be suspended in a journal 25 carried by a bracket arm 26 secured to any convenient part of the body floor, or as indicated to the base of the bracket 23. On the countershaft 24 are journaled miter gears 27 and 28 which are spaced apart so as to mesh with a miter gear 32, presently referred to, on opposite sides of said gear. The gears 27 and 28 are provided with hubs 29 to which are secured pedals 30, these being placed in staggered relation and held in position, together with the hubs 29 and gears 27 and 28, by collars 31 on the shaft 24. Thus it will be seen that the pedals as moved back and forth by the feet of the operator will impart similar oscillatory movements to the gears 27 and 28, and so to the gear 32.

The gear 32 is secured to a rearwardly extending shaft 33 which is the means of carrying power from the shaft 24 to the rear axle, and can be supported in any convenient way, as for instance by brackets 34 on the bottom of the body 10. At its rear end the shaft 33 is journaled as shown at 35 in a yoke 36, and this is journaled on the rear axle 14 and steadied by the arms 37 which are attached to the body 10 of the vehicle. The connection between the gear 38 and the rear axle is substantially like that shown in my prior application above referred to, that is to say, the gear 38 meshes on opposite sides of its center with gears 39 and 40 which are journaled on the rear axle 14. The hubs of the gears 39 and 40 carry pawls 41 which are pressed by springs 42 secured to the hubs of the gears into engagement with ratchet wheels 43 and 44 which are fast on the rear axle as shown at 45 in Fig. 2. Consequently the pedal oscillations will be transmitted through the gear mechanism described to the gears 39 and 40 which will turn backward and forward, and will through the medium of the ratchet wheels 43 and 44 impart a constant rotary motion to the rear axle and the rear wheels of the vehicle. This will be clearly understood. As the gear wheel 39 turns in one direction it will cause the pawl 41 to engage the ratchet wheel 43 and turn the axle to which the ratchet wheel is attached, and when the opposite movement of the gear wheel 38 imparts motion in a similar way to the ratchet wheel 44 and the axle 14, the first mentioned pawl 41 will run back over the teeth of the ratchet wheel 43 ready for a new movement.

From the foregoing description it will be seen that I have provided a simple means of imparting the power of the pedals to the rear axle, that this leaves the steering gear entirely free, and that as a result I get a very substantial and efficient occupant propelled vehicle which can be easily controlled.

I claim:—

1. A wheeled vehicle having front and rear axles, a body mounted on the axles, a manually operated steering gear, a drive shaft extending longitudinally beneath the body, oscillating pedals, means for transmitting the oscillatory motion of the pedals to the driving shaft, and a gear and ratchet connection between the driving shaft and the rear axle whereby the oscillatory movement of the driving shaft is transformed into a constant rotation of the rear axle.

2. A four wheeled vehicle having front and rear axles spaced apart, a body mounted on the axles, a manually operated steering shaft connected with the front axle, a driving shaft extending longitudinally beneath the body from near the front axle to the rear axle, a pedal mechanism for oscillating the driving shaft, and a gear and ratchet connection between the driving shaft and the rear axle by which the oscillations of the driving shaft impart a constant motion to the rear axle.

3. A wheeled vehicle having front and rear axles, a shaft supported near the forward end of the vehicle, a pedal mechanism carried by the shaft, a drive shaft extended rearwardly from the first shaft to the rear axle, means on the first shaft for imparting the oscillatory motion of the pedals to the driving shaft, and a gear and ratchet connection between the driving shaft and the rear axle by which the oscillations of the driving shaft impart a constant motion to the rear axle.

4. A wheeled vehicle having front and rear axles, a steering gear for the front axle, a counter-shaft behind the forward axle, pedal mechanism on the counter-shaft having pedals arranged to move backward and forward, a driving shaft extending from the counter-shaft to the rear axle, means for transmitting the oscillatory motion of the pedals to the driving shaft, and a gear and ratchet connection between the driving shaft and the rear axle by which the oscillations of the driving shaft impart a constant motion to the said axle.

5. A wheeled vehicle having front and rear axles, a steering gear for the front axle, a counter-shaft behind the front axle, oscillating pedals supported from the counter-shaft, a drive shaft extending from the counter-shaft to the rear axle, means for imparting motion from the pedals to the drive shaft, and means for imparting a constant rotary motion from the drive shaft to the rear axle.

WINFIELD D. SMITH.

Witnesses:
WARREN B. HUTCHINSON,
M. G. O'DONNELL.